Figure 1:
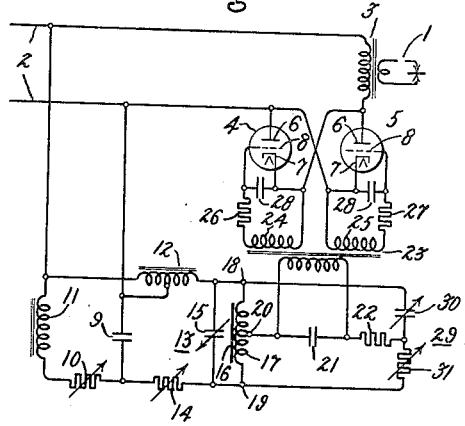

June 17, 1941.    H. W. LORD    2,246,179
ELECTRIC CONTROL CIRCUIT
Filed Dec. 1, 1938

Inventor:
Harold W. Lord,
by Harry E. Dunham
His Attorney.

Patented June 17, 1941

2,246,179

UNITED STATES PATENT OFFICE 2,246,179

ELECTRIC CONTROL CIRCUIT

Harold W. Lord, Schenectady, N. Y., assignor to General Electric Company, a corporation of New York Application December 1, 1938, Serial No. 243,372

4 Claims. (Cl. 171—119)

My invention relates to electric control circuits and more particularly to circuits for controlling electric valve translating apparatus.

In many applications, it is highly desirable to effect energization of a load circuit, such as an alternating current welding circuit, so that the current or the energy transmitted thereto is maintained at a substantially constant value irrespective of the variations in the magnitude of the voltage of the associated alternating current supply circuit. Heretofore numerous arrangements have been devised for maintaining the root-mean-square value of the current transmitted to an alternating current circuit at a substantially constant value. However, many of these arrangements have involved the use of an inordinate number of control elements and have been of the electro-mechanical type involving inherent inaccuracies in performance. In accordance with the teachings of my invention described hereinafter, I provide a new and improved control circuit for electric valve translating apparatus in which the above mentioned disadvantages are obviated, inasmuch as the control system is entirely electrical in nature and in operation.

It is an object of my invention to provide a new and improved electric control system.

It is another object of my invention to provide a new and improved control system for electric valve translating apparatus.

It is a further object of my invention to provide a new and improved control system for maintaining the current transmitted to an alternating current load circuit at a substantially constant value irrespective of variations in the voltage of the associated alternating current supply circuit, and in which a simple and rugged control circuit entirely electrical in nature and operation is employed.

In accordance with the illustrated embodiment of my invention, I provide a new and improved electric control system for energizing an alternating current load circuit, such as a welding circuit, from an associated alternating current supply circuit through a pair of reversely connected electric valve means of the controlled type. Each electric valve means includes a control member for controlling the current conducted thereby. The control circuit is of the type disclosed and claimed in United States Letters Patent No. 2,085,596, granted June 29, 1937 upon my application and assigned to the assignee of the present application. A nonlinear resonant circuit comprising a serially-connected resistance, a capacitance, and a saturable inductive reactance, acting in conjunction with a source of alternating voltage, produce a periodic voltage variable in phase in response to the magnitude of the voltage of the alternating current supply circuit. The periodic voltage appearing across the capacitance is of irregular wave form and comprises harmonics which are undesirable from the standpoint of obtaining precise control of the electric valve means. I provide a filter circuit which is connected across a portion of the non-linear resonant circuit and the source and which absorbs the undesirable harmonics of the periodic voltage so that the resultant voltage impressed on the control members of the electric valve means is essentially of sinusoidal wave form and predominately of the same frequency as the frequency of the alternating current supply circuit. The filter circuit also serves to establish a predetermined minimum phase displacement between the voltage impressed on the control members of the electric valve means and the voltage of the alternating current supply circuit. I also provide a manual phase shifting circuit connected to the filter circuit which permits adjustment of the angle throughout which the periodic voltage varies for a predetermined range of values of the voltage of the supply circuit. In this manner, the voltage and hence the current supplied to the load circuit may be adjusted and the system responds to maintain the root-mean-square value of the current transmitted to the load circuit at a substantially constant value, irrespective of variations in the magnitude of the voltage of the supply circuit.

Figure 2:
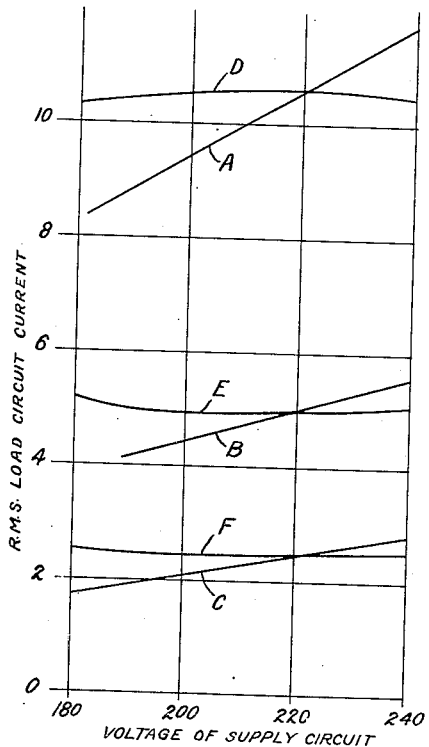

For a better understanding of my invention, reference may be had to the following description taken in connection with the accompanying drawing, and its scope will be pointed out in the appended claims. Fig. 1 diagrammatically illustrates an embodiment of my invention as applied to a system for effecting energization of a welding circuit, and Fig. 2 represents certain operating characteristics of the arrangement shown in Fig. 1.

Referring now more particularly to Fig. 1, my invention is there illustrated as applied to an electric valve translating circuit for effecting energization of an alternating current load circuit, such as an alternating current welding circuit 1, from an associated alternating current supply circuit 2 through a transformer 3 and a pair of reversely connected electric valve means 4 and 5. The electric valve means 4 and 5 are preferably of the type employing an ionizable medium, such as a gas or a vapor, and each comprises an anode 6, a cathode 7 and a control member 8.

I provide a control circuit for impressing on the control members 8 alternating or periodic voltages of variable phase displacement relative to the voltage of the alternating current supply circuit 2 to supply to the welding circuit 1 an alternating current of substantially constant root-mean-square value, irrespective of the variations in magnitude of the voltage of circuit 2. This circuit comprises a nonlinear resonant circuit. By the term "nonlinear resonant circuit," I refer to that type of circuit comprising a capacitance and a nonlinear reactor or saturable inductive reactance. This circuit may be of the series type, the parallel type, or the series-parallel type, or of the more complex networks involving these various types. For the purpose of illustrating my invention, I have chosen to represent the nonlinear resonant circuit as comprising a serially-connected capacitance 9, a resistance 10, and a nonlinear or saturable inductive reactance 11. The inductive reactance 11 is of the self-saturating type. In circuits of this nature, the change from a dissonant condition to a resonant condition is effected by the variation or change in the inductance of the self-saturating inductance or reactor. The self-saturating inductance or reactor may be provided with a closed magnetic core, and when a circuit of this nature is connected across a source of alternating voltage, the current through the series circuit varies in a nonlinear relation with respect to the impressed voltage. That is, as the voltage impressed across the circuit is gradually increased, the current increases substantially linearly with the voltage until a certain value of current is reached at which saturation of the core of the reactor takes place and the inductance thereof resonates with the capacitance. The current then increases to a high value which is several times the value of the current prior to the rapid rise. The rate at which the current rises depends upon the magnitude of the resistance relative to the impedance of the other elements in the circuit. In the present embodiment of my invention, the resistance is adjusted so that the current increases at a rate somewhat less than the maximum rate which is obtainable. In other words, the value of the resistance is comparable to the ohmic impedance of the other elements of the circuit. As the voltage again increases still further, the current again increases with respect to the impressed voltage in a substantially linear relation. These circuits have sometimes been referred to as circuits having the property of nonlinear or ferro-resonance. The nonlinear resonant circuit is adjusted or tuned to resonate at a predetermined value of voltage of the alternating current supply circuit 2.

To produce an alternating voltage which cooperates with a predetermined electrical condition such as a voltage derived from the nonlinear resonant circuit, I employ a transformer 12 which may be connected to the alternating current circuit 2. The transformer 12 may be an auto-transformer, and a predetermined component of the output voltage thereof may be combined with the voltage appearing across the capacitance 9 to produce a periodic voltage which varies in phase in response to variations in the magnitude of the voltage of circuit 2.

I provide a filter circuit 13 which is connected across transformer 12 and capacitance 9 and which absorbs the undesirable harmonics which may be present in the resultant voltage derived from the capacitance 9 and the transformer 12. In this manner, the voltage supplied to the control members 8 of electric valve means 4 and 5 is essentially of sinusoidal wave form and predominately of the same frequency as the frequency of circuit 2. The filter circuit 13 may be of any suitable type and is represented as comprising an adjustable resistance 14 and an adjustable capacitance 15 which may be connected in series relation across a portion of the winding of transformer 12 and capacitance 9.

In addition to absorbing the undesirable harmonics of the voltage derived from capacitance 9 and transformer 12, the filter circuit 13 also serves to establish a predetermined minimum phase displacement between the voltage of circuit 2 and the periodic voltages impressed on control members 8 of electric valves 4 and 5. Of course, since the filter circuit 13 comprises adjustable elements, this predetermined minimum phase displacement may be controlled or adjusted to suit the requirements of the particular application.

I provide a suitable arrangement, such as a transformer 16 comprising a winding 17 having terminal connections 18 and 19 and an electrical intermediate connection 20, which is energized in accordance with a voltage derived from the filter circuit 13. If additional phase displacement is required or desired, I may employ a capacitance 21 and a resistance 22, and the control members 8 of electric valves 4 and 5 may be energized in accordance with the voltage appearing across the capacitance 21. More particularly, a transformer 23 may be energized in accordance with the voltage appearing across capacitance 21. Transformer 23 is provided with a pair of secondary windings 24 and 25 which are connected to control members 8 of electric valve means 4 and 5 through current limiting resistances 26 and 27, respectively. Capacitances 28 may be connected across the cathodes 7 and the control members 8 to suppress extraneous transient voltages which may be present in the control system.

As a means for controlling the voltage and the current supplied to the welding circuit 1, I provide a suitable phase shifting arrangement, such as an impedance phase shifting circuit 29, which may comprise adjustable elements of the static impedance type such as a variable capacitance 30 and a variable resistance 31. In this manner, it will be understood that the adjustment of the capacitance 30 and the resistance 31 establishes the range or region throughout which the voltages impressed on the control members 8 vary for a predetermined range of values of the voltage of the supply circuit 2. In other words, adjustment of the phase shifting circuit 29 establishes the root-mean-square value of current which is maintained in the welding circuit 1.

The operation of the embodiment of my invention diagrammatically illustrated in Fig. 1 will be explained by considering the system when it is operating to transmit to the welding circuit 1 an alternating current of predetermined desired value. Of course, it will be understood that in explaining the operation of the system whereby constant current is maintained in the load or welding circuit 1, the impedance of that circuit must be considered as substantially constant throughout the operation described. Inasmuch as the electric valve means 4 and 5 are reversely connected in parallel, it will be understood that alternating current is transmitted to the transformer 3 from the alternating current welding circuit 1, and that the magnitude of this current is determined by the phase relationship between the anode-cathode voltage of electric valve means 4 and 5 and the periodic voltages which are impressed on the control members 8. The current conducted by the electric valve means 4 and 5 is decreased as the voltages impressed on the control members 8 are retarded in phase from the power-factor angle to positions of more lagging phase displacement. Of course, the phase of the voltages impressed on the control members 8 of electric valves 4 and 5 also controls the root-mean-square value of the current transmitted to the welding circuit 1.

The particular manner in which the nonlinear resonant circuit and the transformer 12 produce a periodic voltage of variable phase displacement in response to variations in magnitude of the voltage of circuit 1 is described in detail in the above mentioned patent. Briefly stated, the variation in the magnitude of the voltage of circuit 2 produces across the capacitance 9 a voltage of irregular wave shape but of variable magnitude and phase displacement which, combined with the voltage produced by transformer 12, produces a periodic voltage of irregular wave shape which varies in phase with respect to the voltage of circuit 2.

The filter circuit 13 serves a dual purpose. This circuit absorbs the undesirable harmonics of the voltage derived from capacitance 9 and transformer 12, and also serves to establish a predetermined minimum phase displacement between the periodic voltage and the voltage of circuit 2.

Adjustment of the phase shifting circuit 29 permits control or adjustment of the voltage or the current supplied to the welding circuit 1. After initial adjustment of the phase shifting circuit 29, the system automatically responds to maintain a predetermined root-mean-square value of current in the welding circuit 1 irrespective of variations of voltage of circuit 2.

The operation of the embodiment of my invention shown in Fig. 1 may be more fully explained by considering the operating characteristics represented in Fig. 2. Curves A, B and C represent the variations in the root-mean-square values of the current supplied to the welding circuit for different values of voltage of circuit 2 when no voltage compensating means is employed. Curves D, E and F represent the load current-supply voltage characteristic when the system shown in Fig. 1 is operating to maintain the root-mean-square value of the current supplied to the load circuit 1 at a substantially constant value under variable voltage conditions. Of course, the different values of current as shown by curves D, E and F may be obtained or established by adjustment of the impedance of the welding circuit or by adjustment of the phase shifting circuit 29. In all cases, it will be observed that the current supplied to the welding circuit 1 is maintained substantially constant, irrespective of the wide variations in the magnitude of the voltage of the supply circuit.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, an alternating current load circuit having a substantially constant impedance, a pair of reversely connected electric valve means for transmitting alternating current to said load circuit, said electric valve means being provided with control members for controlling the conductivity thereof, and means for controlling the root-mean-square value of current transmitted to said load circuit and comprising a nonlinear resonant circuit connected across said supply circuit and responsive to the magnitude of the voltage of said supply circuit and means connected between said resonant circuit and said control members and responsive to a predetermined electrical condition of said resonant circuit for impressing on said control members periodic voltages variable in phase with respect to the voltage of said alternating current supply circuit and having a predetermined minimum phase displacement with respect to the voltage of said supply circuit.

2. In combination, an alternating current supply circuit, an alternating current load circuit having a substantially constant impedance, a pair of reversely connected electric valve means connected between said circuits for controlling the energization of said load circuit and each comprising a control member for controlling the conductivity thereof, and means for impressing on said control members periodic voltages of variable phase displacement relative to the voltage of said supply circuit to maintain the root-mean-square value of the current transmitted to said load circuit at a substantially constant value and comprising a nonlinear resonant circuit responsive to the magnitude of the voltage of said supply circuit and comprising a capacitance and a saturable inductive reactance and a circuit connected between said capacitance and said control members for absorbing undesirable harmonics and for maintaining a predetermined minimum phase displacement between the periodic voltage derived from said capacitance and the voltage of said alternating current supply circuit.

3. In combination, an alternating current supply circuit, a load circuit having a substantially constant impedance, electric valve means connected between said circuits for controlling the energization of said circuits and comprising a control member for controlling the conductivity thereof, a circuit for producing a voltage of variable phase displacement and comprising means for producing an alternating voltage and a nonlinear resonant circuit responsive to the magnitude of the voltage of said supply circuit, a filter circuit responsive to said alternating voltage and an electrical condition derived from said resonant circuit for impressing on said control member a periodic voltage variable in phase and being essentially of the same frequency as that of said supply circuit, and a phase shifting circuit connected to said filter circuit for controlling the range of phase shift of said periodic voltage for a predetermined variation in the magnitude of the voltage of said supply circuit.

4. In combination, an alternating current supply circuit, a load circuit having a substantially constant impedance, electric valve means connected between said circuits for controlling the energization of said circuits and comprising a control member for controlling the conductivity thereof, a circuit for producing a voltage of variable phase displacement and comprising means for producing an alternating voltage and a nonlinear resonant circuit responsive to the magnitude of the voltage of said supply circuit, a filter circuit responsive to said alternating voltage and an electrical condition derived from said resonant circuit for impressing on said control member a periodic voltage variable in phase and being essentially of the same frequency as that of said supply circuit, and a phase shifting circuit connected to said filter circuit for adjusting the angle throughout which said periodic voltage varies for a predetermined range of values of the voltage of said supply circuit.

HAROLD W. LORD.